United States Patent
Li

[11] Patent Number: 6,030,091
[45] Date of Patent: Feb. 29, 2000

[54] TAPE RULE WITH LIGHTING DEVICE

[76] Inventor: Chih Lin Li, 21F-1, No. 33, Sec. 1, Min Sheng Road, Panchaio City, Taipei Hsien, Taiwan

[21] Appl. No.: 09/270,059

[22] Filed: Mar. 16, 1999

[51] Int. Cl.[7] ............................... F21V 33/00; G01B 3/02
[52] U.S. Cl. ............................. 362/109; 362/396; 33/760
[58] Field of Search ..................................... 362/109, 119, 362/120, 23, 362, 396; 33/348, 760, 767, 768, 769, 770

[56]  References Cited

U.S. PATENT DOCUMENTS

| | | | |
|---|---|---|---|
| 4,462,160 | 7/1984 | Cohen et al. | 362/119 |
| 5,544,420 | 8/1996 | Choi | 362/120 |

*Primary Examiner*—Y. Quach
*Attorney, Agent, or Firm*—Bacon & Thomas

[57]  ABSTRACT

A tape rule with a lighting device for illuminating the scale on the tape can either be in the form of built-in type or an externally separated type. The built-in type lighting device includes a press strip, a battery as electric power source, and a light emitting diode (LED) as light source. All components parts are accommodated in a tape rule housing. By pushing a push button installed on the tape rule housing, the LED can be electrically connected to the battery and is turned on to emit light. The externally separated type lighting device includes a battery, an LED and a push button switch all accommodated in a box to form a light source package externally to the tape rule housing. By pressing the push button switch, the LED may make contact with the battery and become energized to emit light.

5 Claims, 6 Drawing Sheets

TAPE RULE WITH LIGHTING DEVICE

BACKGROUND OF THE INVENTION

1. Field of the Invention

The present invention relates to a tape rule with a lighting device, and more particularly, to an inexpensive, simply constructed tape rule containing a lighting device which can illuminate the scale on the tape by actuating an attached light emitting diode (LED) in case the measurement work is to be carried out in a dark environment or at night time.

2. Description of the Prior Art

The tape rule, though an old fashioned instrument, is still playing a very important role in civil, architectural engineering or the like. In many situations the measurement work has to be carried out in a dark environment such as at night time or in tunnels where no aid from an external lighting source can be depended on. The measurement work is carried out by the operator in such way that he must, with great difficulty, hold the tape rule in one hand, while carrying a portable light source such as a flashlight in the other hand to illuminate and read the scale on the tape. Under such a circumstance everybody would eagerly expect to have a tape rule having a light source therewithin.

There is a patented invention "A tape rule with lighting device using a printed circuit board switch" promulgated in ROC Patent No.92264, which discloses a movable actuator to drive a flexible and elastic printed circuit board on which a contactor pad is located, and by displacing the contactor pad the lighting device is connected to a power source so as to turn on the light for illumination. Though this cited case successfully introduced a light source to a tape rule, it is too complicated in construction. Use of excessive amount of components disposed in a small tape rule incurs a high fault rate as well as increased production costs for the tape rule.

Another patented invention "A tape rule with lighting equipment" was promulgated in ROC Patent No.82802 which discloses inclusion of an eccentric wheel to push a copper contactor strip, which causes an LED to be turned on to emit light. However, the second cited case has similarity in every respect with the former one in that too many components are involved. The two cited cases mentioned above are by no means to be considered perfect.

In order to cope with this situation, research and development has been carried out by the inventor of the present invention, so that the inconvenience and disadvantages inherent to the conventional techniques as mentioned above can be eliminated.

SUMMARY OF THE INVENTION

It is an object of the present invention to provide a tape rule with a lighting device wherein the lighting device can either be provided in the form built-in type or an externally separated type according to the user's choice.

It is another object of the present invention to provide a tape rule with a lighting device that is simply constructed with a low fault rate and able to be manufactured with very low production cost.

In order to achieve the objects mentioned above, the present invention is directed to providing a lighting device for a tape rule. The lighting device used for illuminating the scale on the tape can either be in the form of built-in type or externally separated type. The built-in type lighting device comprises a press strip, a battery as electric power source, and a light emitting diode (LED) as light source. All component parts are accommodated in a tape rule housing. By pushing a push button installed on the tape rule housing, the LED is electrically connected to the power source and is turned on to emit light. The externally separated type lighting device comprises a battery, a LED and a push button switch all accommodated in a box to form a light source package externally attached to the tape rule housing. By pressing the push button switch, the LED is electrically connected to the battery to emit lights.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
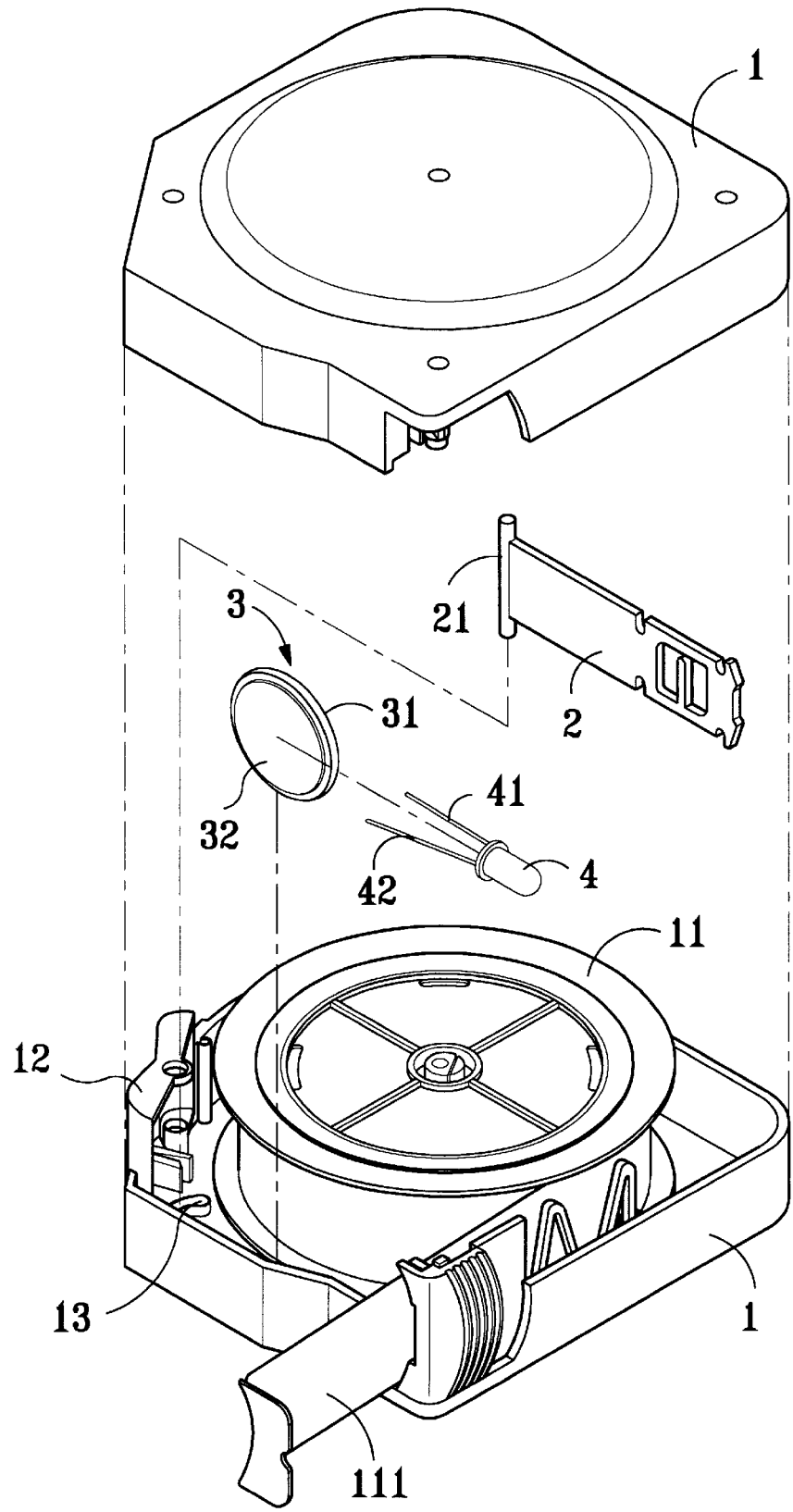
FIG. 1 is a three dimensional exploded drawing of the tape rule with lighting device in a first embodiment according to the present invention.
Figure 2:
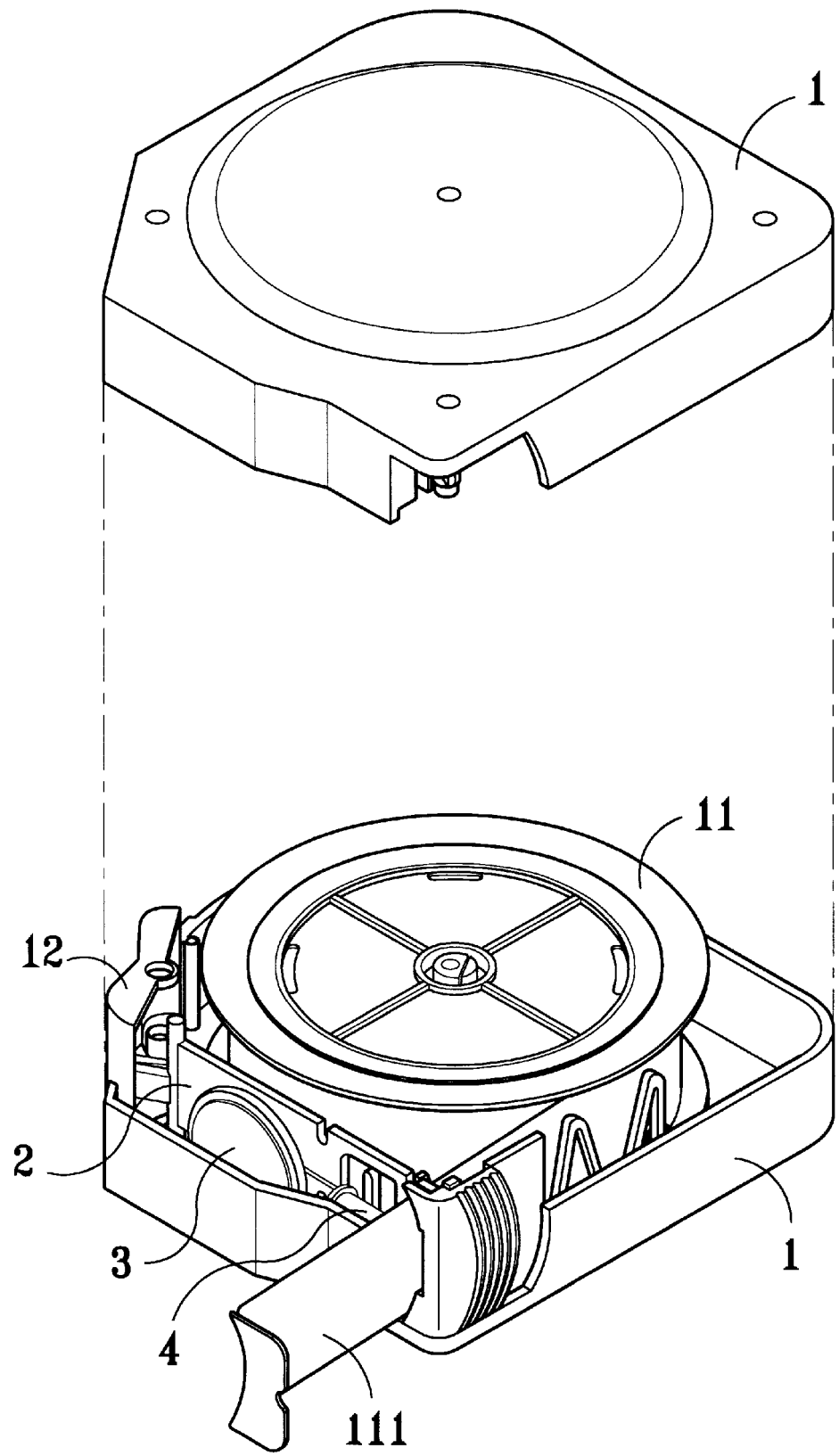
FIG. 2 is a drawing showing the detailed construction of the lighting device in a first embodiment according to the present invention.

FIG. 1 and FIG. 2 show the tape rule with built-in type lighting device of a first embodiment according to the present invention. The tape rule comprises a tape rule housing 1, a press strip 2, a battery 3, an LED 4, and tape 11. The press strip 2, the battery 3, the LED 4, and the tape 11 are all accommodated in the housing 1. There is a tape tip 111 attached to the fore end of the tape 11 provided to enable the operator to grasp and extend the tape 11 out of the housing 1 for measurement. A push button 12 installed on the side wall of the housing 1 is for stopping and fixing the extended tape 11 at a desired position during measurement.

The press strip 2 is installed in the housing 1 between the push button 12 and the tape tip 111. A strut 21 is provided at one end of the press strip 2 near the push button 12. A guide lug 13 is provided on the inner wall of the housing 1 at a position engageable with the strut 21, and a slide guide 14 is provided on the inner wall of the housing 1 near the exit of the tape 11, ie near the tape tip 111 (see FIGS. 3 and 4). When the strut 21 of the press strip 2 is inserted into the guide lug 13, and the other end of the press strip 2 is inserted into the slide guide 14, the movable range of the press strip 2 pushed by the push button 12 is restricted in a certain limit.

The battery 3, which is disposed and fixed in a space between press strip 2 and inner wall of the housing 1, is used as an electric power source. The battery 3 is formed in flat button shape so as to be accommodated in a narrow space in the housing 1 without affecting the size and appearance of the housing 1.

The LED 4 is disposed in the housing 1 ahead of the battery 3 thereof and faces the tape surface on which the scale numerals are provided to illuminate thereon. There are two contact pins 41 and 42 extended out of the rear end of the LED 4. The first contact pin 41 is interposed between a first electrode 31 of the battery 3 and the press strip 2, whereas the second contact pin 42 is permanently connected to a second electrode 32 of the battery 3. When the press strip 2 is pushed by push button 12 to bring the first contact pin 41 into contact with the first electrode 31 of the battery 3, the two pins 41, 42 the two electrodes 31, 32 form an electric circuit to energize the LED 4.

Figure 3:
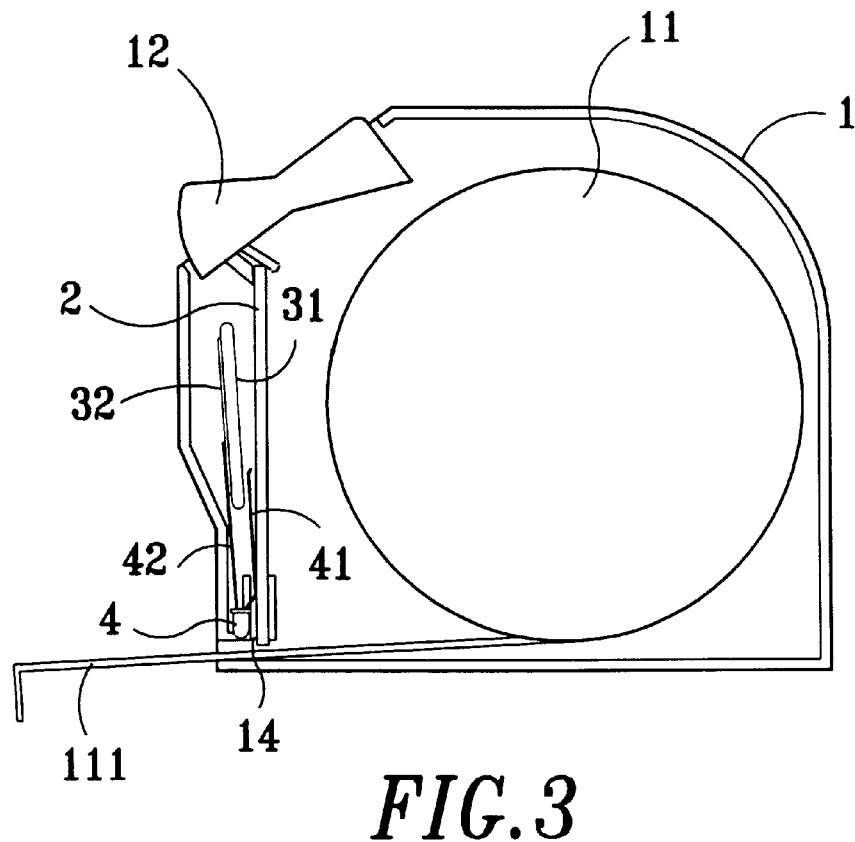
FIG. 3 is an illustrative drawing showing the state of the lighting device before actuation in a first embodiment according to the present invention.
Figure 4:
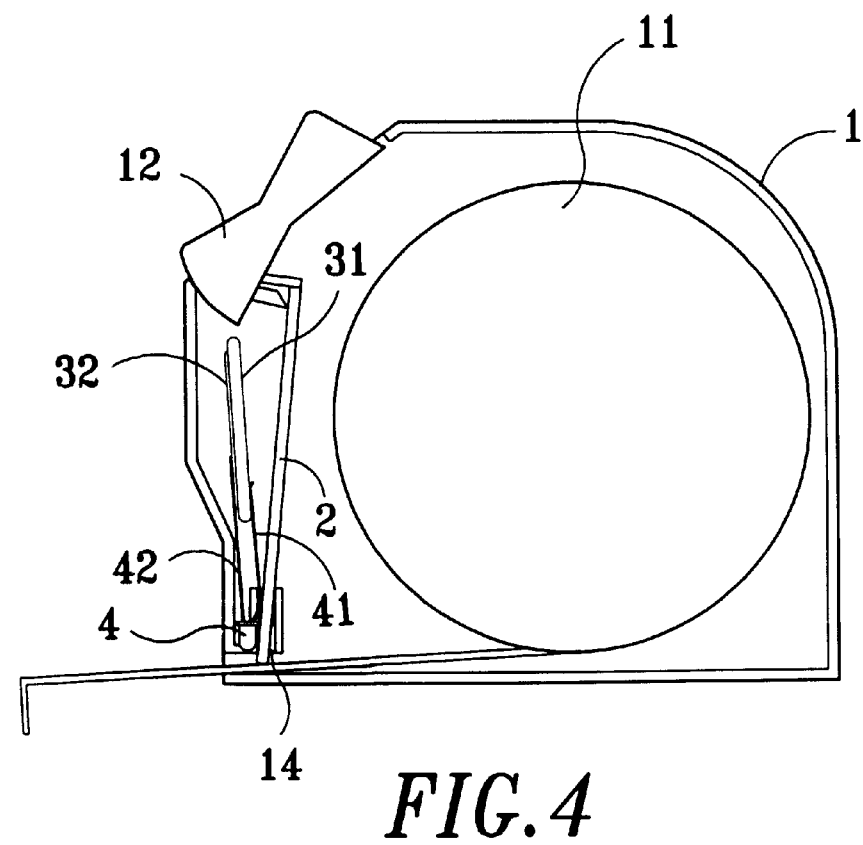
FIG. 4 is an illustrative drawing showing the state of the lighting device after actuation in a first embodiment according to the present invention.

Referring to FIGS. 3 and 4, when a measuring operation is to be carried out the tape 11 is first pulled out of the housing 1, and then the push button 12 is pushed to cause the strut 21 of the press strip 2 to move within the guide lug 13. At this time the other end of the press strip 2 will extend out of the slide guide 14 and hold the tape 11 firmly at current the position without allowing it to retract so that the measuring operation can be conveniently and accurately performed. At the same time, the end of the press strip 2 near the slide guide 14 is also forced towards the inner edge of the housing 1 and causes mutual contact between the first contact pin 41 and the first electrode 31. The LED 4 is therefore energized to illuminate the scale on the tape 11.

Figure 5:
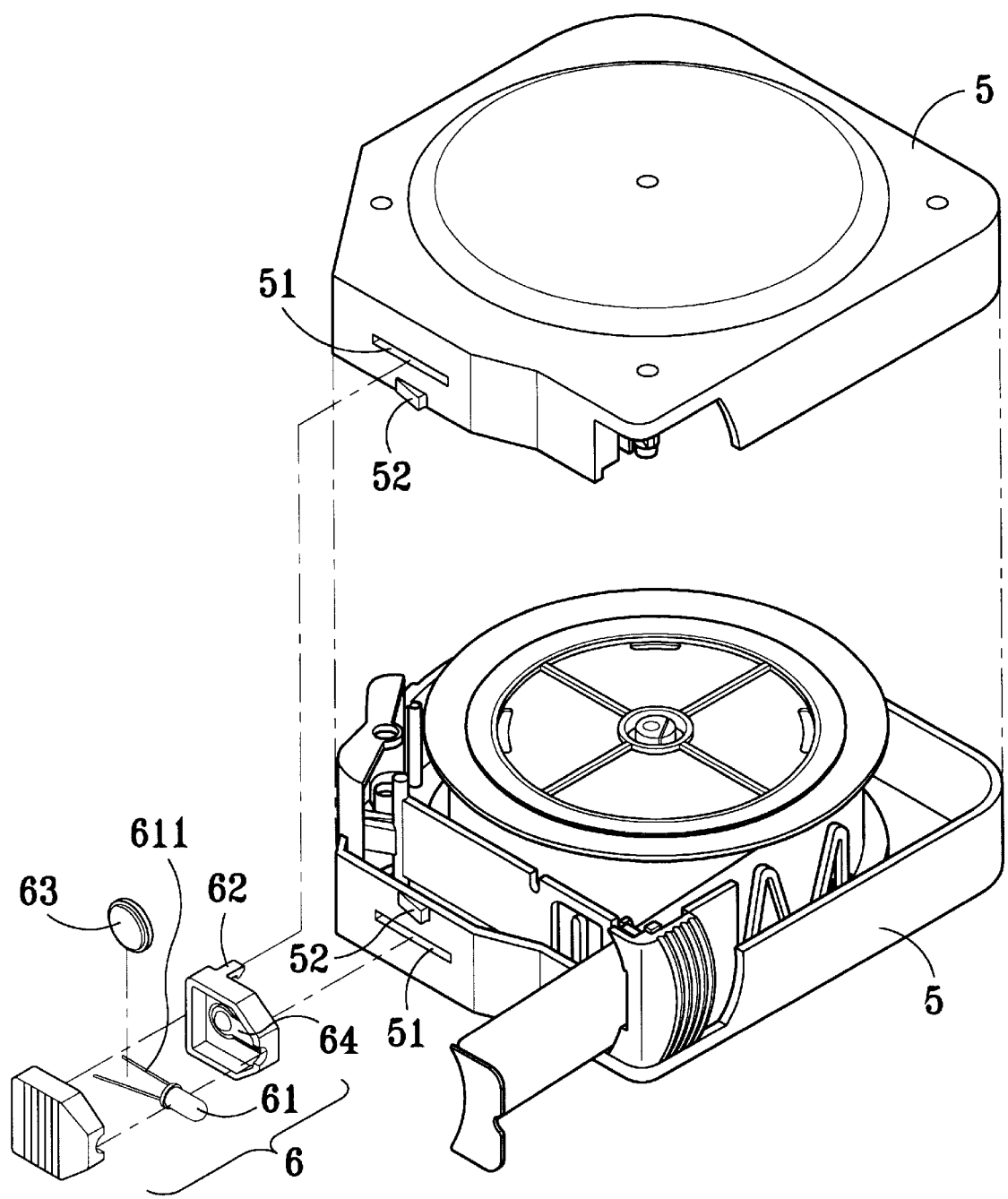
FIG. 5 is a three dimensional exploded drawing of the tape rule with lighting device in a second embodiment according to the present invention.
Figure 6:
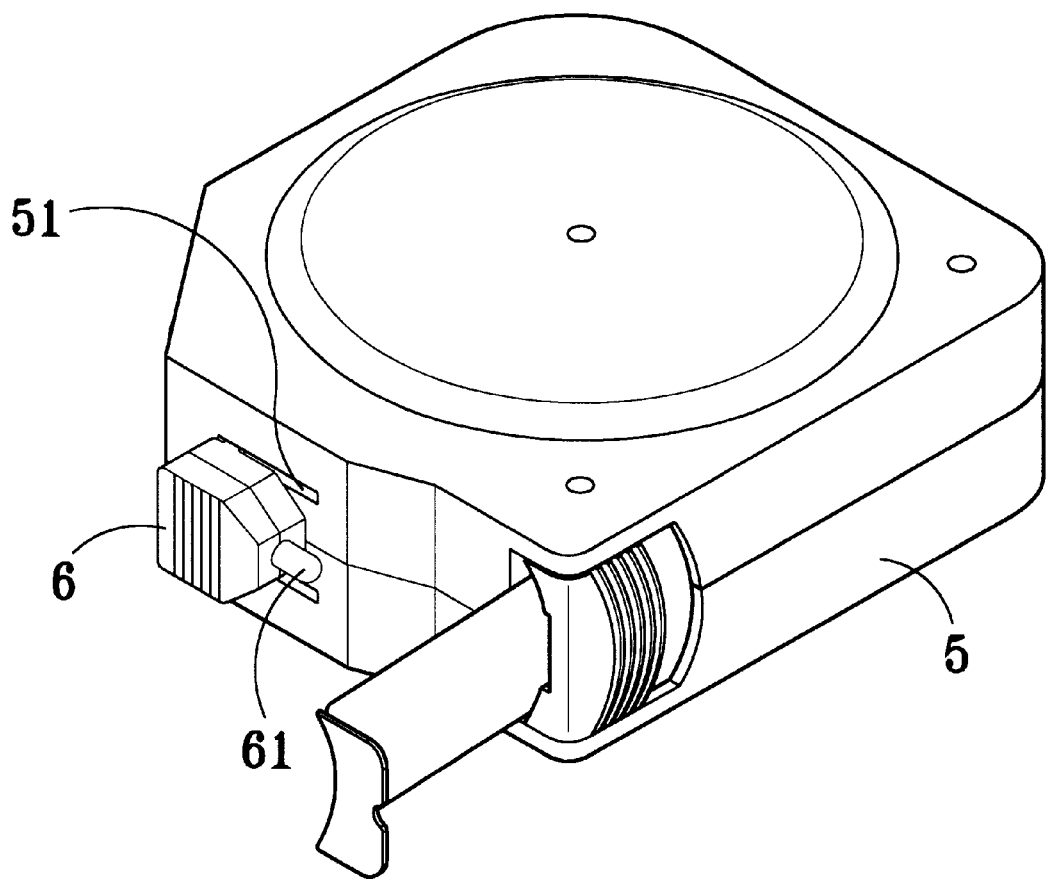
FIG. 6 is a drawing showing the detailed construction of the lighting device in a second embodiment according to the present invention.

Referring to FIGS. 5 and 6, the drawings show the tape rule with an externally separated lighting device in a second embodiment according to the present invention. The tape rule comprises a tape rule housing 5, a tape (not given a numeral), and a separate light source package 6. There are two parallel guide slots 51 carved on the outer front wall surface of the housing 5 for providing a passage for the light source package 6 to move along. A protuberance 52 is provide at one end of the guide slots 51 and located at a position midway between the two slots. This protuberance 52 is used for actuating the light source.

The light source package 6 includes an LED 61 at the front end thereof facing the scale on the tape. There are two hooks 62 each disposed at each side of the light source package 6 respectively. The two hooks 62 are clipped on the housing 5 by way of the guide slots 51 so as to fix the light source package 6 on the housing 5 while permitting the source package to be displaced to and fro along the guide slots 51. The light source package 6 further includes a battery 63 therein for supplying electric power to the LED 61. A push button switch 64 is provided at the lower end of the battery 63. This push button switch 64 is used for electrically connecting the LED 61 to the battery 63 and energizing the former. The push button switch 64 and the protuberance 52 are aligned in a straight line with the moving route of the light source package 6.

Before the light source is energized, the push button switch 64 has nothing to do with the battery 63. When the light source is to be used, the push button switch 64 is pushed to move the light source package 6 until it is halted by the proterbulance 52. The push button switch 64 then is forced upwards so as to cause a contact pin 611 of the LED 61 to electrically contact the battery 63 and energize the LED 61 to illuminate the tape surface.

Figure 7:
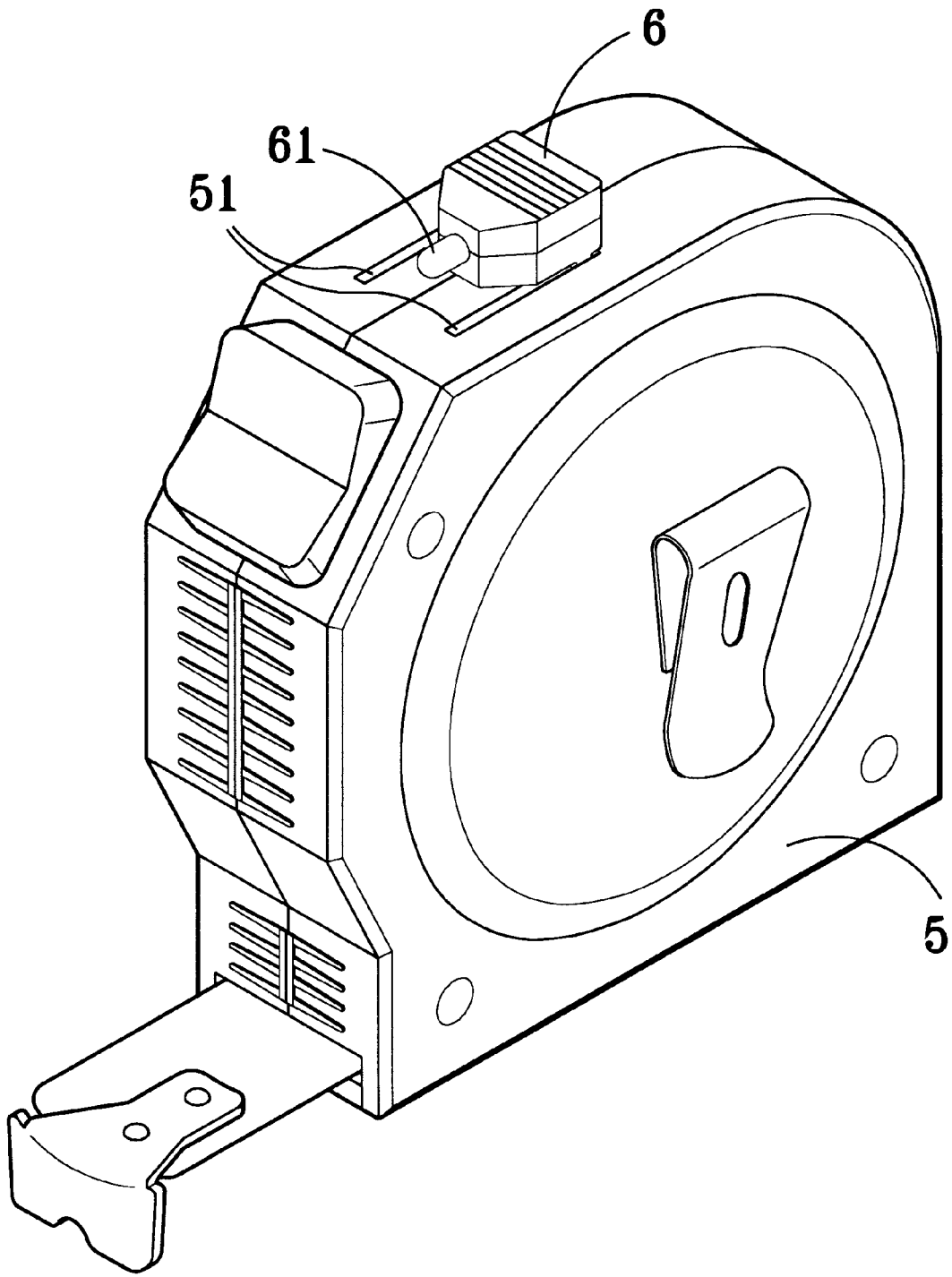
FIG. 7 is a drawing showing another type of construction of the lighting device in a second embodiment according to the present invention.

FIG. 7 shows another construction of the device, in which two parallel guide slots 51 are provided on the outer top surface of the housing 5. The light source package 6 is mounted on the guide slots 51. The light source package 6 is conveniently located corresponding to the thumb position when the tape rule is held by the operator to provide the best operational condition. Furthermore, the LED 61 provides forward illumination which is the best optical direction for illuminating the tape surface.

The tape rule with lighting device according to the present invention has many advantageous characteristics compared to those tape rules made according to conventional techniques. The advantages are:

1. The contact pins of the LED can be directly connected to and the battery without employing additional conductors, the electrical energy supplied by the battery is efficiently consumed by the LED without undersired power loss or voltage drop.
2. The simple construction of the present invention results in greatly saving materials and minimizing production cost.
3. The low fault rate and long durability of the present invention will be considered the worthiest tape rule by users for use a in dark environment or at night time.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A tape rule with lighting device comprising:
   a tape rule housing with a tape therein, and a push button installed on a side wall of said tape rule housing;
   a press strip having a first end secured to said push button and a second end disposed at a position near an exit of said tape from said tape rule housing;
   a battery disposed and fixed in a space between said press strip and an inner wall of said tape rule housing;
   a light emitting diode (LED) disposed in said tape rule housing, said LED facing a tape surface on which scale numerals are provided and having two contact pins extending out of a rear end of said LED, the first contact pin being interposed between a first electrode of said battery and said press strip, and the second contact pin being permanently connected to a second electrode of said battery;
   whereby when said push button is pressed, said press strip causes said first contact pin to contact said first electrode of said battery to energize said LED.

2. The tape rule with lighting device as claimed in claim 1, wherein said battery has a flat button shape so as to be easily accommodated in said tape rule housing without affecting a size and appearance of said tape rule housing.

3. The tape rule with lighting device as claimed in claim 1, wherein said tape rule housing has a guide lug at the position near said push button, a slide guide is provided on said inner wall of said tape rule housing near said exit of said tape, a strut is provided at said first end of said press strip near said push button, said strut being arranged to engage said guide lug to cause said press strip to move when said push button is pressed, and said second end of said press strip is positioned in said slide guide to restrict movement of said press strip.

4. A tape rule with lighting device comprising:
   a tape rule housing, two parallel guide slots provided in an outer surface of the tape rule housing, and a protuberance provided at one end of said guide slots and located between said two guide slots;
   a light source package having two hooks extending from said light source package and inserted into said guide slots to clip said light source package on said tape rule housing so as to fix said light source package on said tape rule housing while enabling said light source package to move to and fro along said guide slots, said light source package further including an LED and a battery, said LED being disposed at a front end of said light source package, and a push button switch is provided at a lower end of said battery, said push button switch and said protuberance being aligned in a straight line with a moving route of said light source package so that said protuberance extends into the moving route, and said LED having two contacts, a first of said contacts extending between said battery and said push button switch, whereby before energizing said LED said push button switch is not in contact with said battery, and whereby when said light source package is moved along said guide slots until halted by said protuberance, at which time said push button switch is forced upwards by the protuberance to thereby cause said first contact pin of said LED to electrically contact said battery and energize said LED.

5. The tape rule with lighting device as claimed in claim 4, wherein said two parallel guide slots are provided in an outer top surface of said tape rule housing to mount said light source package thereon so that said light source package is located at a position corresponding to a thumb position of an operator when the tape rule housing is held by the operator, and so that said LED provides forward illumination in a direction parallel to a direction at which said tape exits said housing.

* * * * *